Jan. 7, 1936.  W. J. MORRISSEY  2,027,191

COMBINATION PROJECTOR AND SOUND REPRODUCING ASSEMBLY

Filed Jan. 10, 1933

WITNESSES
Edw. Thorpe
Chris Feinle

INVENTOR
William J. Morrissey
BY
Munn, Anderson, Stanley, Foster & Liddy
ATTORNEYS.

Patented Jan. 7, 1936

2,027,191

UNITED STATES PATENT OFFICE 2,027,191

COMBINATION PROJECTOR AND SOUND-REPRODUCING ASSEMBLY

William J. Morrissey, Brooklyn, N. Y.

Application January 10, 1933, Serial No. 651,033

6 Claims. (Cl. 88—16.2)

This invention relates to an assembly of instrumentalities applicable to a motion picture and sound-reproducing machine; the assembly being advantageously applicable to machines of the indicated character suitable for home use, though not confined to such use, as the invention may be applied to large machines used in motion picture houses and theaters.

The principal object of the invention is the provision of an assembly or relative disposition of instrumentalities in which a single source of light will be common to a condensing lens and photoelectric cell, to the end that installations may be made on machines of the indicated character in an economical and efficient manner, and that the machine will be compact and certain of the instrumentalities thereof readily accessible, removable, and replaceable.

With the foregoing, other objects of the invention will appear from the embodiment of the invention which, by way of example, is described in the following specification and illustrated in the accompanying drawing, in which Figure 1 is a vertical transverse section illustrating an assembly in accordance with the invention;

Figure 1:
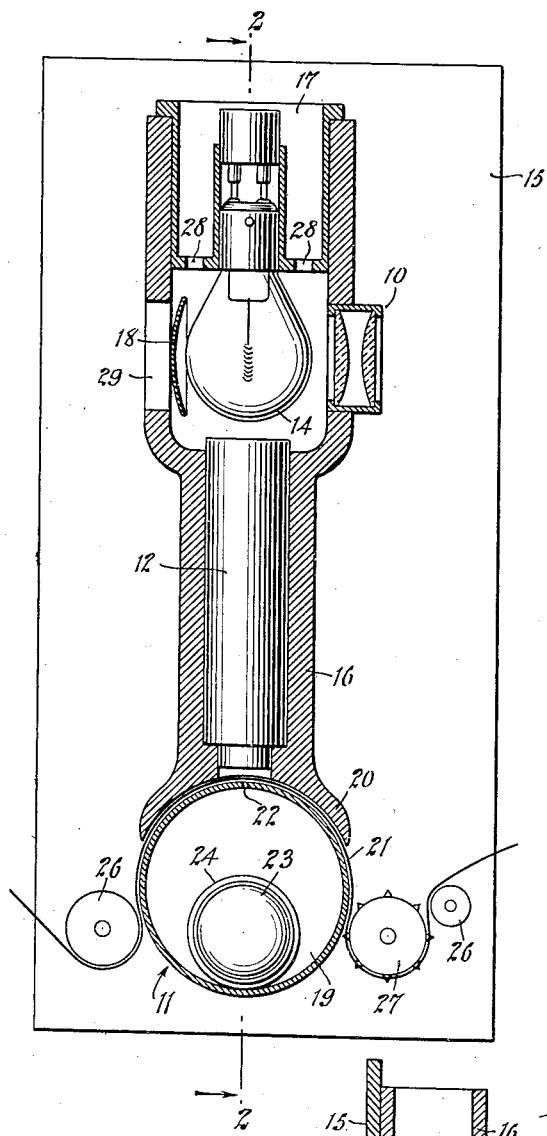

As stated hereinabove, the present invention is applicable to motion picture and sound-reproducing machines in which a sound and picture film is properly fed in relation to a shutter mechanism and the sound take-off or exciter of the sound track of the film. The assembly illustrated is not shown applied directly to a machine of the indicated character, but merely illustrates the particular instrumentalities which are included in the combination applicable to a machine for projecting motion pictures and reproducing sound of the sound track on the film which also has the pictures.

Referring now more particularly to the drawing, it will be apparent that there have been shown a condensing lens 10, a sound take-off 11, an optical system 12, and a single source of light 14. The aforesaid instrumentalities are retained or supported in a definite and effectual relationship by means presently to be described or an equivalent means. In the present instance there is shown a support or wall 15 to which is secured a casing 16. A socket 17 is removably arranged on the upper end of the casing 16. The source of light 14, in the form of an electric lamp, is plugged in the socket 17 and has electrical connection therewith. The condensing lens 10 is supported by the casing 16, adjacent the lamp 14. A suitable reflector 18 is also supported by the casing 16 in light-reflecting relation to the lamp 14, so as to reflect rays of light from said lamp 14 towards the lens 10. The optical system 12 is arranged and suitably supported within the casing 16 below the lamp 14. The sound take-off 11 includes a cylindrical drum 19 which is supported by the wall 15 at the lower end of the casing 16, which is provided with a light shield 20, the inside of which is concave or curved to correspond to the contour of the drum 19. The drum 19 is spaced from the shield 20 so as to accommodate the sound and picture film 21. The drum 19 has a light aperture 22. The sound take-off 11 also includes a photoelectric cell 23, which is arranged within the drum 19 and is plugged in a suitable socket 24 within the drum 19, the latter having a removable section or cover 25 enabling the insertion and removal of the cell 23 whenever the occasions arise. It is to be understood that the film 21 will be fed continuously past the light at the lower end of the optical system 12 by suitable means of the machine including guide rollers 26 and a drag sprocket 27.

From the foregoing it will be apparent that the source of light provided by the lamp 14 will be common to both the condensing lens 10 and the sound take-off 11. The light will be reflected and imposed upon the condenser and issue in the usual manner to project the pictures of the film 21, while the optical system 12 will condense and direct light through the aperture 22, but modified by the sound track of the film 21 to excite the photoelectric cell 23, which in turn will influence the sound-amplifying means of the machine.

In order to allow heat to escape so that overheating by the lamp 14 will be averted and the problem of ventilation will be met, there are provided apertures 28 in the socket 17 and an aperture 29 in the casing 16 adjacent the lamp 14.

Figure 2:
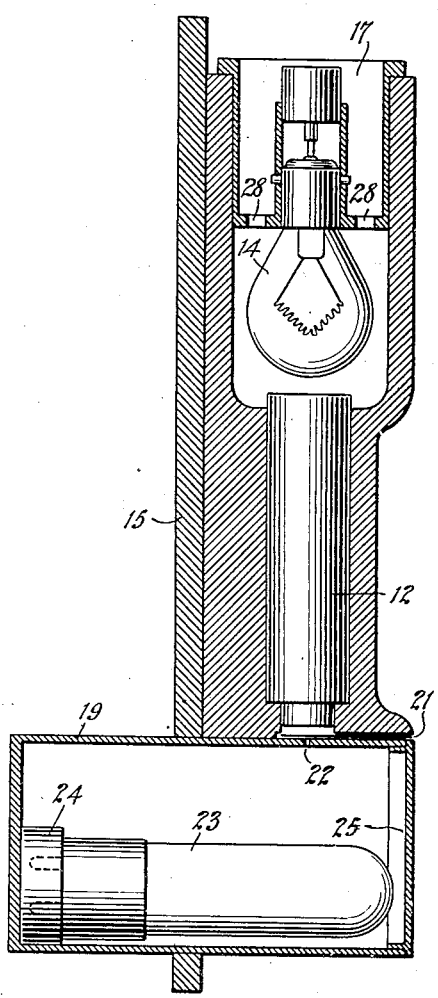
Fig. 2 is a section taken on the line 2—2 of Fig. 1.
Figure 3:
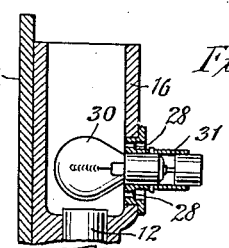
Fig. 3 is a fragmentary section showing a modification.

In cases where an increase in light is desired and in order to give a correspondingly increased opening for the escape of heat and ventilation, a lamp of increased wattage is employed and the same is applied to the casing 16 through one side thereof so as to be disposed horizontally and held in this position by the socket which is supported directly by the casing 16, as shown in Fig. 3. In Fig. 3, the lamp is designated 30 and its socket is designated 31. In other respects the relation of the lamp 30 to the condenser, reflector, and optical system is the same as that shown in Figs. 1 and 2.

It will be apparent that there has been illustrated and described a convenient and economic assembly; that the instrumentalities may be readily assembled; and that the photoelectric cell will be adequately shielded from extraneous light.

I claim:

1. In a projector, a film carrying both a picture record and a sound record, a lamp house, a socket supported in said lamp house, an incandescent lamp supported in said socket, a reflector positioned to one side of said lamp, a condensing lens positioned on an opposite side of said lamp in line with said filament and said reflector whereby the greater portion of light from said lamp is formed into a beam having an axis at right angles to said lamp house and adapted to be utilized for projecting pictures, an optical scanning unit adjacent to said lamp and having its center axis in line with filament and at right angles to said first axis, a cylindrical housing closely adjacent to said lamp house having a portion thereof forming a sound gate and including an opening formed therein in line with said scanning unit and said filament, a light sensitive cell positioned within said housing with its active elements positioned to receive light passing in a straight line from said filament through said scanning unit, and means for moving said film through said sound gate to cause said sound record to modulate the light passing to said cell.

2. The invention according to claim 1 in which the socket is removably arranged in the upper end of the lamp house and in which the lamp when in operative position therein is inverted.

3. In a projector, a film strip carrying both a picture record and a sound record, a lamp house, a socket carried by said lamp house, an incandescent lamp having a mono-filament supported in said socket, a reflector positioned on one side of said lamp, a condensing lens positioned on an opposite side of said lamp, said reflector filament and condensing lens forming an axis at right angles to said lamp house and adapted to pass the greater portion of light from said lamp through said picture record, an optical scanning unit positioned within said lamp house in endwise relation to said lamp and having its center axis in line with said filament and at right angles to said first axis, a cylindrical housing closely adjacent to the bottom of said lamp house, a portion of said housing having a slit formed therein in line with said optical scanning unit thereby forming a sound gate, a light sensitive cell positioned within said cylindrical housing and having its active elements so positioned that light passing in a straight line from said filament via said optical scanning unit and said slit may impinge thereon, and means for moving said film strip through said sound gate to cause said sound record to modulate the light impinging upon the active elements of said cell.

4. The invention according to claim 1 in which said second optical system is positioned in endwise relation to said lamp and in which light passes in a straight line from said lamp to one portion of the film and in which light simultaneously passes from said second optical system in a straight line to another portion of said film.

5. The combination according to claim 1 in which the light sensitive cell is enclosed in a drum which forms a portion of the sound gate.

6. The combination according to claim 3 in which the lamp house is provided with a top closure member projecting downwardly into said lamp house forming a support for said socket and having an annular passage formed therein and ventilating holes communicating with both said passage and the interior of the lamp house.

WILLIAM J. MORRISSEY.